J. B. HOLESTEINE.
NUT LOCK.
APPLICATION FILED MAY 10, 1907.

919,170.

Patented Apr. 20, 1909.

WITNESSES:

Joseph B. Holesteine,
INVENTOR

ATTORNEYS

UNITED STATES PATENT OFFICE.

JOSEPH B. HOLESTEINE, OF ST. ALBANS, WEST VIRGINIA.

NUT-LOCK.

No. 919,170.    Specification of Letters Patent.    Patented April 20, 1909.

Application filed May 10, 1907. Serial No. 372,909.

*To all whom it may concern:*

Be it known that I, JOSEPH B. HOLESTEINE, a citizen of the United States, residing at St. Albans, in the county of Kanawha and State of West Virginia, have invented a new and useful Nut-Lock, of which the following is a specification.

This invention relates to improvements in means for locking nuts or bolts so as to prevent their loosening, and it has for its object to provide a bolt that is especially adapted for use on railway rails, connecting rods, and other parts that are subject to vibrations, whereby the nut is effectually locked to the bolt to prevent its backing or loosening, although, when so desired, the nut may be unlocked to permit a readjustment thereof, the locking action being effected without the necessity of mutilating the nut or bolt.

Another object of the invention is to provide a device of this character that may be manufactured cheaply and is composed of few parts that are not liable to get out of order.

To these and other ends, the invention comprises the various novel features of construction and combination and arrangement of parts, which will be hereinafter more fully described, and pointed out particularly in the claim appended hereto.

Figure 1:
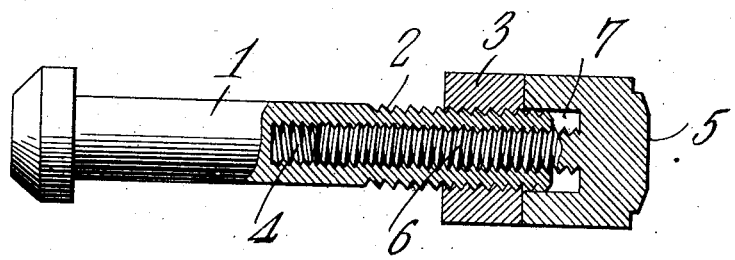
Figure 2:
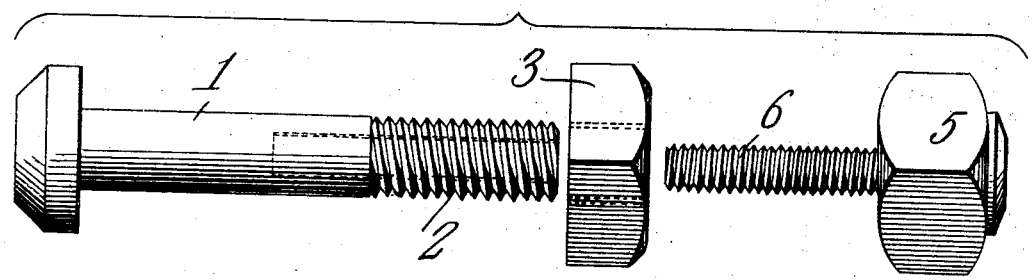

In the accompanying drawings:—Figure 1 is a view partly in section showing a nut lock constructed in accordance with the present invention. Fig. 2 is a view showing the device taken apart.

Corresponding parts in the several figures are indicated throughout by similar characters of reference.

The invention is capable of being applied to bolts and screws of various constructions, and it comprises, in the present instance, a bolt 1 that may be of any suitable size and shape to suit the conditions under which it is to be used, the shank of the bolt being provided for a suitable distance from its free end with threads 2 having preferably a right hand pitch, a nut 3 of the usual, or any preferred, construction being provided with threads to match those on the bolt. The shank of the bolt is provided with a bore extending from its end toward the bolt head, the walls of the bore being provided with screw threads 4 having a pitch leading in the opposite direction from the pitch of the threads on the exterior of the bolt, the threads within the bore of the bolt being, in the present instance, of a left hand pitch.

The locking member is composed, in the present instance, of a cap or head 5 having its periphery preferably of a shape corresponding to that of the nut 3, that is to say, it is square, hexagonal, or otherwise angular in shape to receive a wrench, a single wrench in such cases serving to operate the nut and also the locking member. Arranged axially of the locking member is a screw 6 having threads to match those formed in the axial bore of the bolt, so that the nut 3 is turned in one direction and the locking member is turned in a reverse direction to produce a movement of the nut or locking member in a direction toward or from the bolt head, so that while rotation of the nut 3 in one direction will permit a loosening thereof, or a movement toward the end of the bolt, rotation of the locking member in the same direction will operate to tighten the latter or move it toward the bolt head, and, consequently, after the nut has been tightened and the locking member has been screwed into the end of the bolt until it engages behind the nut, the latter will be locked, for the reason that rotation of the nut in a direction that will loosen it or permit it to move toward the end of the bolt will cause the locking member to move toward the bolt head by reason of the reverse pitches of the threads on which the nut and locking member respectively operate. It will be understood, of course, that the nut and exterior of the bolt may be provided with threads of a left hand pitch, and the screw of the locking member provided with threads of a right hand pitch, but the arrangement shown is generally preferred, for the reason that the bolt may be made in the standard way, that is to say, with the usual right hand thread, and the nut to fit, the internal threads being the only change required in applying the present invention to the ordinary bolt.

In order to permit adjustment of the nut in a direction axially of the bolt and not interfere with the locking action, the locking member is preferably provided with a circular or annular recess or channel 7 of a suitable depth which surrounds the base of the screw 6 and is adapted to accommodate the threaded end of the bolt which projects beyond the nut, the outer walls of the recess being smooth to permit the threaded portion of the bolt to enter and leave it without becoming mutilated or caught, the face of the cap or head surrounding the recess following the nut on the bolt and serving to coöperate with the rear thereof to prevent rotation or backing.

The invention is capable of use in various connections wherein it is desirable or necessary to lock the nut to the bolt to prevent its loosening, and it is especially adapted for use at the joints of railway rails and on connecting rods and other movable parts of the machinery that are subjected to vibration that tends to loosen the ordinary bolts, and as the locking action is effected without the necessity of mutilating either the bolt or the nut, the latter is capable of readjustment from time to time, it being merely necessary to partially unscrew the locking member. Moreover, the construction is so simple that the bolt and its coöperating parts may be made and sold at a slight additional cost over bolts of the ordinary construction, as it requires one extra part only.

From the foregoing description of the invention, and from an inspection of the drawing, it will be seen that the threaded bore 4 of the bolt shank is of less length than the said shank, but of a greater length than that portion of the shank throughout which the exterior threads are formed, and that the stem 6 of the locking member, when threaded into the bore 4 of the bolt shank, will practically completely fill the said bore, inasmuch as the stem is of substantially the same length as the bore; and it will be understood that by reason of this construction, the bolt shank is strengthened throughout that portion in which the bore and the exterior threads are formed. It will further be noted that the recess in the head 5 is of the same diameter as the shank of the bolt, so that when the locking member, comprised of the said head and the stem, is applied to the bolt, the threaded end of the bolt will project into the recess, and the head will be securely and firmly supported in such manner that it cannot be broken off from its stem 6, if struck a blow.

What is claimed is:—

In a nut lock, a bolt having threads formed exteriorly throughout a portion of its length, the said bolt being formed with a threaded bore of less length than the shank of the bolt but of greater length than that portion throughout which the exterior threads are formed, a nut threaded onto the bolt, a stem threaded into the bore of the bolt, the said stem being of substantially the same length as the said bore, and a head formed integral with the stem at its outer end and formed in its inner face with an annular recess to receive the outer end of the bolt, said recess being of the same diameter as the shank of the bolt, the said recess circumscribing the said outer end of the stem, said head being squared for the engagement of a wrench whereby it may be rotated to bear against the nut, the mutually engaging faces of the nut and head being smooth and unbroken, the stem extending into the bore of the bolt to a point beyond the exteriorly threaded portion thereof, the said stem completely filling the said bore throughout the extent of the said exteriorly threaded portion.

In testimony that I claim the foregoing as my own, I have hereto affixed my signature in the presence of two witnesses.

JOSEPH B. HOLESTEINE.

Witnesses:
   MAYNARD A. BLAKER,
   GRANT HOLESTEINE.